(12) United States Patent
Vankayala et al.

(10) Patent No.: US 12,028,886 B2
(45) Date of Patent: Jul. 2, 2024

(54) METHOD AND SYSTEM FOR OPTIMAL RESOURCE MANAGEMENT IN A NETWORK

(71) Applicant: Samsung Electronics Co., Ltd., Suwon-si (KR)

(72) Inventors: Satya Kumar Vankayala, Bangalore (IN); Mudit Gupta, Bangalore (IN); Seungil Yoon, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 50 days.

(21) Appl. No.: 17/302,315

(22) Filed: Apr. 29, 2021

(65) Prior Publication Data

US 2021/0360643 A1    Nov. 18, 2021

(30) Foreign Application Priority Data

May 13, 2020   (IN) .............................. 202041020104
Apr. 7, 2021   (IN) ............................. 2020 41020104

(51) Int. Cl.
*H04W 72/542*    (2023.01)
*G16Y 10/75*     (2020.01)
(Continued)

(52) U.S. Cl.
CPC ........... *H04W 72/542* (2023.01); *G16Y 10/75* (2020.01); *H04L 1/08* (2013.01); *H04L 41/16* (2013.01); *H04W 72/0446* (2013.01)

(58) Field of Classification Search
CPC ........... H04W 72/085; H04W 72/0446; H04W 72/1226; G16Y 10/75; H04L 41/16; (Continued)

(56) References Cited

U.S. PATENT DOCUMENTS

2016/0374109 A1    12/2016  Rico Alvarino et al.
2019/0053211 A1*    2/2019  Ying ..................... H04W 72/14
(Continued)

FOREIGN PATENT DOCUMENTS

WO    2019104624 A1    6/2019
WO    2020040723 A1    2/2020
(Continued)

OTHER PUBLICATIONS

International Search Report and Written Opinion of the International Searching Authority dated Jul. 27, 2021 in connection with International Application No. PCT/KR2021/005239, 7 pages.

*Primary Examiner* — Nishant Divecha

(57) ABSTRACT

Disclosed herein is a method and a network for managing resources in a network. The method comprises determining a predefined number of repetitions of data packets for receiving the data packets from a user equipment (UE) associated with a network node. Further, a minimum number of repetitions, out of the predefined number of repetitions, required for successfully decoding the data packets received from the UE is estimated based on one or more network status parameters. Thereafter, the data packets are decoded within the minimum number of repetitions and one or more resources allocated for remaining number of repetitions are released, thereby optimally managing the resource utilization in the network.

13 Claims, 6 Drawing Sheets

(51) Int. Cl.
*H04L 1/08* (2006.01)
*H04L 41/16* (2022.01)
*H04W 72/0446* (2023.01)

(58) Field of Classification Search
CPC . H04L 41/0895; H04L 41/142; H04L 41/145; H04L 41/147; H04L 41/40; H04L 43/0888; H04L 41/0896; H04L 41/149; H04L 43/20; H04L 43/0876; H04L 1/08
See application file for complete search history.

(56) References Cited

U.S. PATENT DOCUMENTS

| | | |
|---|---|---|
| 2019/0239087 A1 | 8/2019 | Hwang et al. |
| 2020/0068608 A1 | 2/2020 | Ye et al. |
| 2020/0154486 A1* | 5/2020 | Cheng .............. H04W 74/0833 |

FOREIGN PATENT DOCUMENTS

| | | | | |
|---|---|---|---|---|
| WO | WO-2020071993 A1 * | 4/2020 | ........... | H04L 1/0003 |
| WO | WO-2020187386 A1 * | 9/2020 | ........... | H04W 48/12 |

* cited by examiner

METHOD AND SYSTEM FOR OPTIMAL RESOURCE MANAGEMENT IN A NETWORK

CROSS-REFERENCE TO RELATED APPLICATIONS

This application claims priority under 35 U.S.C. § 119(a) to Indian Patent Application Serial No. 202041020104 (PS), which was filed in the Indian Patent Office on May 13, 2020 and Indian Patent Application Serial No. 202041020104 (CS), which was filed on Apr. 7, 2021, the entire disclosure of each of these applications is incorporated herein by reference.

The following specification particularly describes the disclosure and the manner in which it is to be performed.

BACKGROUND

1. Field

The present disclosure is, in general, related to resource allocation in cellular networks. Particularly, but not exclusively, the present disclosure relates to a method and a resource management system for optimally managing resources in a cellular network.

2. Description of Related Art

In order to enhance coverage of cellular network, data packets and information are transmitted in a repeating fashion, over a communication channel. Repeating transmission would have an effect of increased cell radius and signal penetration and makes these communication channels decodable even when the signal quality or transmission power is very poor.

Generally, the number of repetition levels for an enhanced Machine Type Communication (eMTC) type User Equipment (UE) may vary from 1 to 2048 for uplink and downlink data channels. For instance, the UE may be asked to transmit "N" number of times to a Base Station (BS) in a Physical Uplink Control Channel (PUCCH) and/or a Physical Uplink Shared Channel (PUSCH). Similarly, in a general set up, the BS may be able to decode the data with "M" number of repetitions, where M<N. That is, though the UE is asked to complete a selected number of repetitions, there may be a possibility that the BS can decode the data at an "Mth" repetition, before completing all the "N" repetitions. The existing technologies fail to take advantage of this possibility.

That is, in the existing technologies, under the above said conditions, the BS may not exploit the decoding information unless the "N" repetitions are complete, thereby using up all the resources allocated for the repeating transmission. This in turn degrades spectral efficiency and throughput of the network. Hence, there is a need for an intelligent resource allocation mechanism in the network to improve the spectral efficiency and throughput of the network.

The information disclosed in this background of the disclosure section is only for enhancement of understanding of the general background of the disclosure and should not be taken as an acknowledgement or any form of suggestion that this information forms the prior art already known to a person skilled in the art.

SUMMARY

Disclosed herein is a method for managing resources in a network. The method comprises determining a predefined number of repetitions of data packets for receiving the data packets from a user equipment (UE) associated with a network node. Further, the method comprises estimating a minimum number of repetitions, out of the predefined number of repetitions, required for successfully decoding the data packets received from the UE based on one or more network status parameters. Once the minimum number of repetitions is estimated, the data packets are decoded within the minimum number of repetitions. Finally, one or more resources allocated for remaining number of repetitions are released, thereby optimally managing resources in the network.

Further, disclosed herein is a network node for managing resources in a network, the network node comprising a memory and a processor communicatively coupled to the memory, the processor configured to: determine a predefined number of repetitions of data packets for receiving the data packets from a user equipment (UE) associated with a network node; estimate, based on one or more network status parameters, a minimum number of repetitions required for successfully decoding the data packets received from the UE, wherein the minimum number of repetitions is determined in out of the predefined number of repetitions; decode the data packets within the minimum number of repetitions; and release one or more resources allocated for remaining number of repetitions.

Further, disclosed herein is a non-transitory computer-readable medium comprising program code, that when executed by a processor of a network node, causes the network node to: determine a predefined number of repetitions of data packets for receiving the data packets from a user equipment (UE) associated with a network node; estimate, based on one or more network status parameters, a minimum number of repetitions required for successfully decoding the data packets received from the UE, wherein the minimum number of repetitions is determined in out of the predefined number of repetitions; decode the data packets within the minimum number of repetitions; and release one or more resources allocated for remaining number of repetitions.

The foregoing summary is illustrative only and is not intended to be in any way limiting. In addition to the illustrative aspects, embodiments, and features described above, further aspects, embodiments, and features will become apparent by reference to the drawings and the following detailed description.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The accompanying drawings, which are incorporated in and constitute a part of this disclosure, illustrate exemplary embodiments and, together with the description, explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and regarding the accompanying figures, in which.

Figure 1:
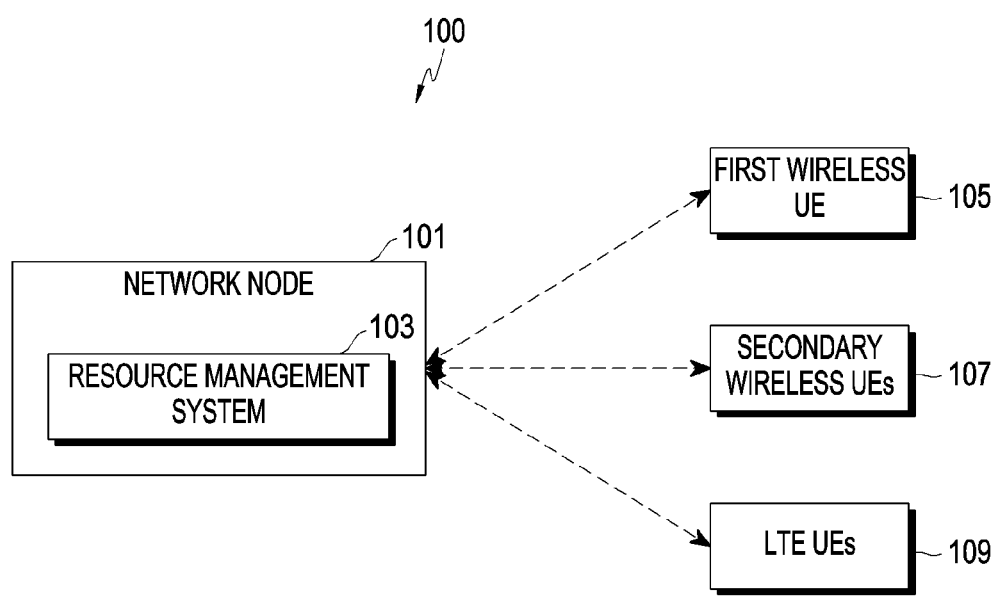
FIG. 1 illustrates exemplary environment for a method of optimal resource management in a network in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether such computer or processor is explicitly shown.

DETAILED DESCRIPTION

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the specific forms disclosed, but on the contrary, the disclosure is to cover all modifications, equivalents, and alternative falling within the scope of the disclosure.

The terms "comprises", "comprising", "includes", or any other variations thereof, are intended to cover a non-exclusive inclusion, such that a setup, device, or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The present disclosure relates to a method and a resource management system for allocating resources in wireless communication network including, but not limited to, the fourth generation (4G), the fifth generation (5G), the sixth generation (6G) and virtualized radio access network (VRAN) systems, under co-existence of devices with Internet of Things (IoT) mechanism. In an embodiment, the devices may be low power devices such as, narrow Band IoT devices. Generally, data from UEs with the NBIoT mechanism is given a high priority over legacy UEs in frequency allocations. These UEs have dedicated resources as well. Also, a network node determines the number of resources and the repetition levels (a level selected between 1 to 2048) for these UEs based on a coverage enhancement (CE) mode "A" or "B." The CE mode "A" is optimized for moderate coverage enhancement. Whereas the CE mode "B" provides extremely deep coverage.

In an embodiment, the method of present disclosure comprises determining a predefined number of repetitions of data packets for receiving the data packets from a first wireless user equipment (UE) having IoT mechanism which are associated with a network node using the resource management system configured at the network node. Further, a minimum number of repetitions, out of the predefined number of repetitions, required for successfully decoding the data packets received from the first wireless UE is estimated based on one or more network status parameters. Thereafter, the data packets are decoded within the minimum number of repetitions and one or more resources allocated for remaining number of repetitions are released, thereby optimally managing the resource utilization in the network. Thus, the present disclosure helps in achieving higher throughput and higher spectral efficiency, without adding any new signalling to the channel.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1 illustrates exemplary environment for a method of optimal resource management in a network in accordance with some embodiments of the present disclosure.

As shown in FIG. 1, the environment 100 may include a network node 101, such as, a base station (BS), transceiver and the like, and one or more user equipment (UEs) associated with the network node 101. The network node 101 is a fixed point of communication for the UE on a carrier network for providing network services. The wireless communication may include different generations such as, $2^{nd}$ generation (2G), 3rd generation (3G), long term evolution (LTE), $5^{th}$ generation (5G), $6^{th}$ generation (6G) and non-3gpp technologies.

The network node 101 is configured with a resource management system 103 for performing optimal resource management in a network by connecting the network node 101 and the one or more UEs. In an embodiment, the network node 101 is connected to a cloud random access networks (RAN) (not shown explicitly in FIG. 1), which comprise multiple stand-alone nodes. In one embodiment, the resource management system 103 may be configured as a separate entity to the network node 101. In another embodiment, the resource management system 103 may be configured in association with other entities in the network node 101, in order to efficiently perform optimal resource management. Each network node 101 may cover a small area, whereas a group of network nodes provide coverage over a continuous area. Each network node 101 process and transmit the own signal to and from the UE's, and forwards data to and from the UEs.

In one embodiment, the one or more UEs in the network may include, without limiting to, a first wireless UE 105 with (IoT) mechanism, one or more secondary wireless UE 107 having NBIoT mechanism, and one or more long term evolution (LTE) or 5G (not shown explicitly in FIG. 1) UEs 109. The secondary wireless UE 107 being different from the first wireless UE 105. In an embodiment, the first wireless UE 105 and the secondary wireless UE 107 may or may not follow different wireless communication technique.

In an embodiment, the first wireless UE 105 and the one or more secondary wireless UE 107 may include enhanced machine type communication (eMTC) devices and IoT devices, which may be low power, wide area coverage UEs that support Internet of Things (IoT) transmissions through lower device complexity and provide extended coverage. The eMTC UEs may be used for transmitting mission critical and/or smaller chunks of sensitive information collected by an IoT system to a relevant BS. On the other hand, the LTE or 5G UEs 109 may include any user device, directly associated with an end user, such as a mobile telephone, a laptop, a computer, and the like.

In an embodiment, when the data and/or information collected by the first wireless UE 105 has to be transmitted to the network node 101, the first wireless UE 105 may initiate a repeating transmission to ensure that the data is successfully transmitted to the network node 101. In an implementation, the repeating transmission may happen at different levels, which varies from 1 to 2048 for uplink and downlink transmission. Generally, the repetition level may be selected based on application and/or criticality of the data transmission.

In the existing BS configuration, the BS may start decoding the data/information received from the first wireless UE 105 only after the first wireless UE 105 has completed all the repetitions. Consequently, the BS has to reserve all the resources for the UE until all the repetitions are complete. The present disclosure, being provided in the present disclosure, optimizes the resource allocation at the network node 101 by intelligently reducing the number of repetitions and ensuring that the resources, which are allocated to the first wireless UE 105 are released and/or deallocated sooner.

In an embodiment, the resource management system 103 configured in the network node 101 may constantly monitor the network connecting the network node 101 and the first wireless UE node for determining a predefined number of repetitions of data packets for receiving the data packets from the first wireless UE 105. Subsequently, the resource management system 103 may estimate a minimum number of repetitions, out of the predefined number of repetitions, required for successfully decoding the data packets received from the first wireless UE 105 based on one or more network status parameters. In an embodiment, the one or more network status parameters may include, without limiting to, at least one of time of transmission of the data packets, BS identification (BSID), frequency of transmission, details of day of the transmission, location of the network node, density and distribution of network traffic, climate conditions, information of the first wireless UE 105, type of data packets, network measurements and other information related to daily events and occasions. A person skilled in the art would understand that, any other status parameters, not mentioned explicitly herein, may also be used in the present disclosure.

In an embodiment, the resource management system 103 may estimate the minimum number of repetitions using a pre-trained neural network configured in the resource management system 103. The pre-trained neural network may be trained using the one or more network status parameters to analyse real-time values of the one or more network status parameters and then predict the minimum number of repetitions.

In an embodiment, the resource management system 103 may implement the neural network/machine learning algorithms either in centralized unit (CU), distributed unit (DU), open radio access network (O-RAB) or centralized RAN or cloud RAN OR virtual RAN or any other cloud architecture. In an embodiment, a rule-based mechanism may also be used to implement the present disclosure. In an embodiment, the neural network may be a convolution neural network (CNN) or recurrent neural network (RNN), or deep neural network (DNN) or sparse CNN or sparse DNN or Sparse CNN or/and reinforcement-based algorithms or combination of above algorithms to estimate the minimum number of repetitions. In an embodiment, ML, AI AND NN are used interchangeably in the present disclosure. In an embodiment, BS, or cell or eNodeB or gNodeB or transmitter or RU or RRH can be used interchangeably.

In an embodiment, the resource management system 103 may use information of neighboring BS or cells load, channel quality indicator distribution, fading statistics, showing statistics, UE distribution, load distribution, interference information, UE capabilities, transmission modes, BS ID, BS operating frequency, day/time/climate conditions information to predict the minimum number of repetitions. Further, long/short/infinite impulse response (IIR)/finite impulse response (FIR) filtered/Markov chain-based estimation information may be used for estimations. All these or sub-set of parameters may be used to estimate required transmission for the UE. In an embodiment, the above algorithms may be implemented on UE or per cell basis. For example, if Markov chain-based estimation is used, long statistics for transition table may be used with last repetition information. Similarly, the FIR/IIR filtered data may be provided to the neural network along with the above-mentioned parameters to estimate the required repetitions and frequency band.

In an embodiment, once the minimum number of repetitions are estimated, the resource management system 103 may facilitate decoding of the data packets within the minimum number of repetitions. Thereafter, the resource management system 103 may cause the one or more resources allocated for the remaining number of repetitions to be released, thereby optimally managing resources in the network. In an embodiment, the resource management system 103 may anytime during transmission may overwrite early grant of resource by either reducing or increasing number of repetitions.

In another embodiment, resource management may also be performed in a downlink reception scenario by the UEs. UE's such as, the first wireless UE 105 may estimate minimum number of receptions before decoding. In case if data is decoded successfully, the first wireless UE 105 may not listen to remaining transmission and may convey to the network node 101 regarding decoding of the data earlier itself by either by using common or shared resources in the uplink transmission. The estimation of the minimum number of reception in the first wireless UE 105 may be performed by an on-device neural network (NN)/machine learning (ML)/artificial intelligence (AI) modules in the first wireless UE 105 or by using a look-up table. In an embodiment, the look-up tables may be prepared by receivers or transmitters in the network, which may be provided to the first wireless UE 105 either periodically or non-periodically. In an embodiment, the neural network/machine learning algorithms in the first wireless UE 105 may be a convolution neural network (CNN) or a recurrent neural network (RNN), or a deep neural network (DNN), or a sparse CNN or sparse DNN or Sparse CNN or/and reinforcement-based algorithms or combination of above algorithms to estimate the minimum number of repetitions.

In an embodiment, the first wireless UE 105 may use information of neighboring BS or cells load, channel quality indicator distribution, fading statistics, showing statistics, UE distribution, load distribution, interference information, UE capabilities, transmission modes, BS ID, BS operating frequency, day/time/climate conditions information to predict the minimum number of repetitions. Further, long/short/infinite impulse response (IIR)/finite impulse response (FIR) filtered/Markov chain-based estimation information may be used for estimations.

Figure 2:
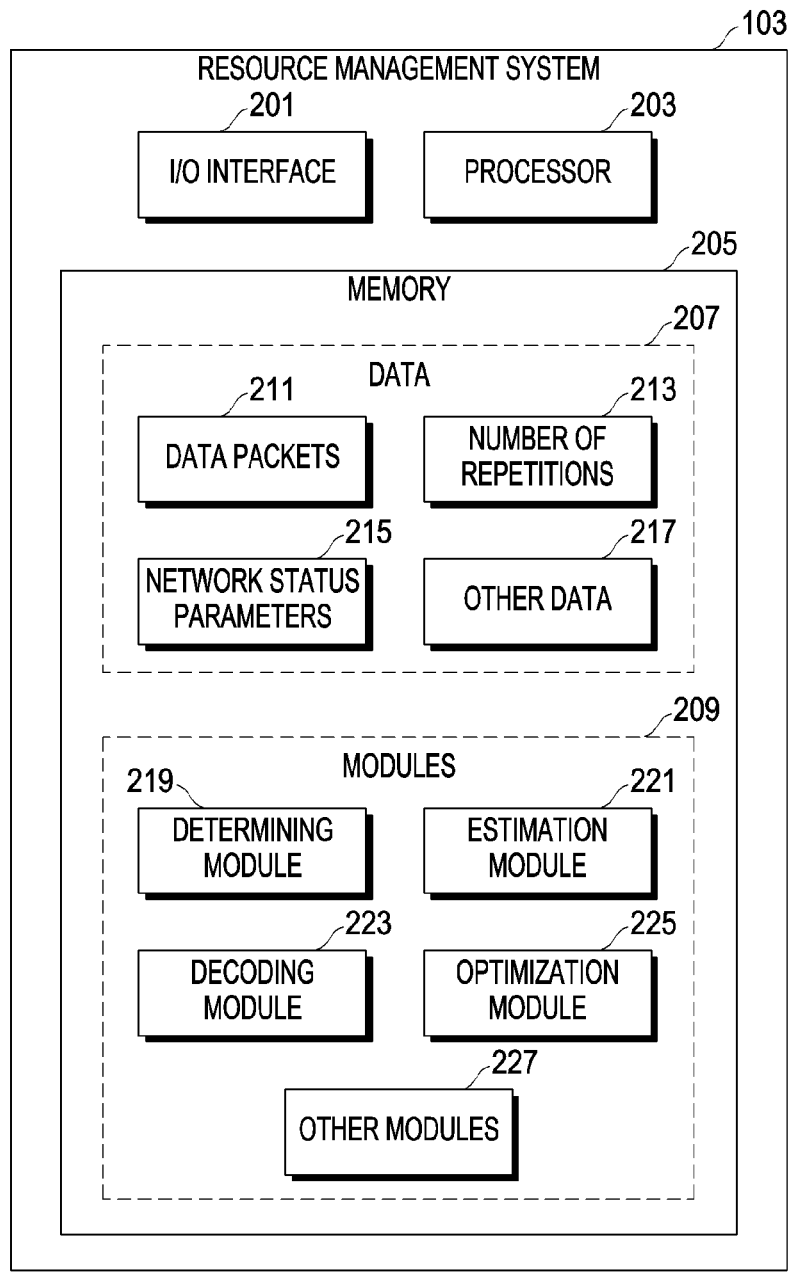
FIG. 2 illustrates a detailed block diagram of a resource management system in accordance with some embodiments of the present disclosure.

In an embodiment, estimation data at the first wireless UE 105 may be used for learning to improve the estimation using reinforcement learning technique. In case, the estimation is correct and accurate, positive reward may be provided, otherwise negative rewards may be given for the learning algorithm. FIG. 2 illustrates a detailed block diagram of a resource management system in accordance with some embodiments of the present disclosure.

In some implementations, the resource management system 103 may include an I/O interface 201, a processor 203 and a memory 205. In an embodiment, the processor 203 may be one of a graphics processing unit (GPU), a central processing unit (CPU) or hybrid of GPU and CPU or a general-purpose processor. The I/O interface 201 may be communicatively interfaced with the network node 101 and the one or more UEs associated with the network node 101 for collecting and monitoring the one or more network status parameters. The memory 205 may be communicatively coupled to the processor 203 and may store data 207 and one or more modules 209. The processor 203 may be configured to perform one or more functions of the resource management system 103 for ensuring optimal resource management in the network, using the data 207 and the one or more modules 209.

In an embodiment, the data 207 stored in the memory 205 may include, without limitation, the data packets 211, number of repetitions 213, the one or more network status parameters 215 and other data 217. In some implementations, the data 207 may be stored within the memory 205 in the form of various data structures. Additionally, the data 207 may be organized using data models, such as relational or hierarchical data models. The other data 217 may include various temporary data and files generated by the one or more modules 209 while performing various functions of the resource management system 103.

In an embodiment, the data packets 211 may be the data packets and/or information collected by the one or more UEs and being transmitted to the network node 101.

In an embodiment, the number of repetitions may be the default number of repetitions assigned for completing the transmission of the data packets to the network node 101.

In an embodiment, the network status parameters may include, without limiting to, the one or more network status parameters comprises at least one of time of transmission of the data packets, BS identification (BSID), frequency of transmission, details of day of the transmission, location of the BS, density and distribution of network traffic, climate conditions, information of the first wireless UE 105, type of data packets, network measurements and other information related to daily events and occasions. In an implementation, the one or more network status parameters may be collected and/or determined with the help of sensors and real-world events in the region of the network node 101.

In an embodiment, the data 207 may be processed by the one or more modules 209 of the resource management system 103. In some implementations, the one or more modules 209 may be communicatively coupled to the processor 203 for performing one or more functions of the resource management system 103. In an implementation, the one or more modules 209 may include, without limiting to, a determining module 219, an estimation module 221, a decoding module 223, an optimization module 225 and other modules 227.

As used herein, the term module may refer to an application specific integrated circuit (ASIC), an electronic circuit, a hardware processor (shared, dedicated, or group) and memory that execute one or more software or firmware programs, a combinational logic circuit, and/or other suitable components that provide the described functionality. In an implementation, each of the one or more modules 209 may be configured as stand-alone hardware computing units.

In an embodiment, the other modules 227 may be used to perform various miscellaneous functionalities of the resource management system 103. It may be appreciated that such one or more modules 209 may be represented as a single module or a combination of different modules.

In an embodiment, the determining module 219 may be configured for determining predefined number of repetitions of data packets for receiving the data packets from the first wireless UE 105. In an embodiment, the predefined number of repetitions may be the default number of repetitions assigned to the network node 101. In an embodiment, the number of repetition levels for the wireless UE may vary from 1 to 32 for a physical uplink control channel (PUCCH) for carrying the control information. Similarly, the number of repetition levels for the wireless UE may vary from 1 to 2048 for a physical uplink shared channel (PUSCH) for carrying the data packets. Further, the network node 101 may determine the repetition levels for both PUCCH and PUSCH channels based on channel conditions. As an example, there may be a total 4 repetition levels, $n\{j\}$, where j=1 to 4 for a coverage enhancement (CE) mode A, as shown in Table 1 below.

TABLE 1

CE Mode A PUSCH repetition levels (DCI Format 6-0A)

| Higher layer parameter "pusch-maxNumRepetitionCEmodeA" | $\{n1, n2, n3, n4\}$ |
|---|---|
| Not configured | $\{1, 2, 4, 8\}$ |
| 16 | $\{1, 4, 8, 16\}$ |
| 32 | $\{1, 4, 16, 32\}$ |

On the other hand, there may be a total of 8 repetition levels $n\{j\}$, where j=1 to 8 for the CE mode B, as shown in Table 2 below.

TABLE 2

CE Mode B PUSCH repetition levels (DCI Format 6-0B)

| Higher layer parameter 'pusch-maxNumRepetitionCEmodeB' | $\{n1, n2, K, n8\}$ |
|---|---|
| Not configured | $\{4, 8, 16, 32, 64, 128, 256, 512\}$ |
| 192 | $\{1, 4, 8, 16, 32, 64, 128, 192\}$ |
| 256 | $\{4, 8, 16, 32, 64, 128, 192, 256\}$ |
| 384 | $\{4, 16, 32, 64, 128, 192, 256, 384\}$ |
| 512 | $\{4, 16, 64, 128, 192, 256, 384, 512, 768\}$ |
| 768 | $\{8, 32, 128, 192, 256, 384, 512, 768\}$ |
| 1024 | $\{4, 8, 16, 64, 128, 256, 512, 1024\}$ |
| 1536 | $\{4, 16, 64, 256, 512, 768, 1024, 1536\}$ |
| 2048 | $\{4, 16, 64, 128, 256, 512, 1024, 2048\}$ |

In an embodiment, the estimation module 221 may be configured for estimating the minimum number of repetitions, out of the predefined number of repetitions, required for successfully decoding the data packets received from the first wireless UE 105 based on one or more network status parameters.

In an embodiment, the decoding module 223 may be configured for facilitating the decoding of the data packets within the minimum number of repetitions. In other words, the decoding module ensures that the decoding of the data packets is completed within the minimum number of repetitions.

In an embodiment, the optimization module 225 may be configured for optimizing the resource allocation by releasing the one or more resources allocated for the remaining number of repetitions. The one or more resources, so released by the optimization module 225, may be allocated to at least one of the LTE or 5G UEs 109 or the one or more secondary wireless UE associated with the network node 101.

In an embodiment, as an example, the first wireless UE 105 may require a minimum of $n\{j\}$, where j=1 to 8 repetitions, for successful decoding of the PUSCH data at the network node 101. Accordingly, a scheduler may conservatively select the next repletion level n $\{j+1\}$, where j+1=1 to 8 repetition levels, for the first wireless UE 105. Here, considering that the network node 101 successfully decodes the PUSCH in subframe "k" where $(n\{j\}<k<n\{j+1\})$, the network node 101 may exploit this decoding information and utilize the frequency resources allocated for that first wireless UE 105 in those $\Delta=(n\{j+1\}-k)$ subframes to the one or more secondary wireless UE 107 or the LTE or 5G UEs 109.

In an embodiment, the actual value of PUSCH repetitions for the first wireless UE 105 may be 2048. Suppose if the network node 101 can decode the PUSCH data in 1024 repetitions ($\Delta$), the network node 101 may intelligently utilize the remaining resources and make the remaining resources available to the other UEs. For example, if the network node 101 has already used 512 subframes out of the 1024 subframes allocated for the first wireless UE 105, after decoding the PUSCH data, the network node 101 may simply subtract the remaining subframes (i.e., 512 subframes) from the total allocated subframes and reallocate the subtracted subframe to one or more other UEs.

In an embodiment, when following an aggressive approach, the network node 101 may try to decode the UE data after each transmission time interval (TTI) till 1024 subframes. If the subframes are successfully decoded at any TTI, then the network node 101 may stop decoding at that interval. Otherwise, the network node 101 may continue to decode according to existing chase combining method.

Figure 3A:
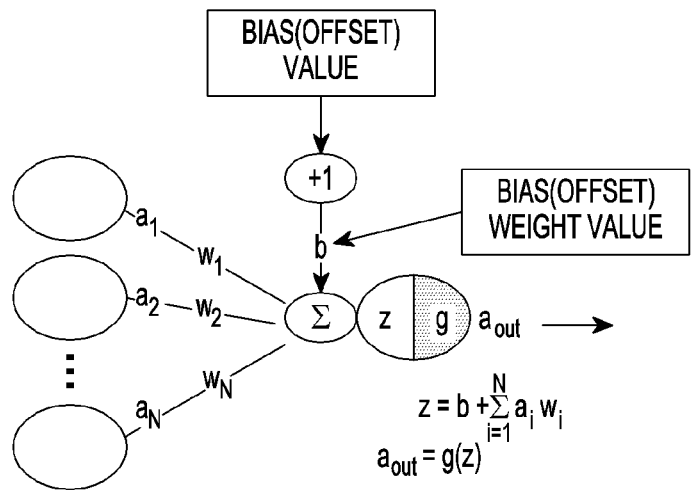
FIG. 3A illustrates an exemplary depiction of a sigmoid neuron configured to estimate minimum number of repetitions in accordance with some embodiments of the present disclosure.

FIG. 3A illustrates an exemplary depiction of a sigmoid neuron configured to estimate minimum number of repetitions in accordance with some embodiments of the present disclosure. In FIG. 3A, "$a_{out,j}$" may represent the next set of subframes that the network node 101 may combine and decode at the $j^{th}$ step. Here, the sigmoid neuron of the pre-trained neural network may calculate "$a_{out,j}$" depending on the input parameters and also consider the previous weight matrix. This ensures that the training of the pre-trained neural network is accurate and optimized.

Figure 3B:
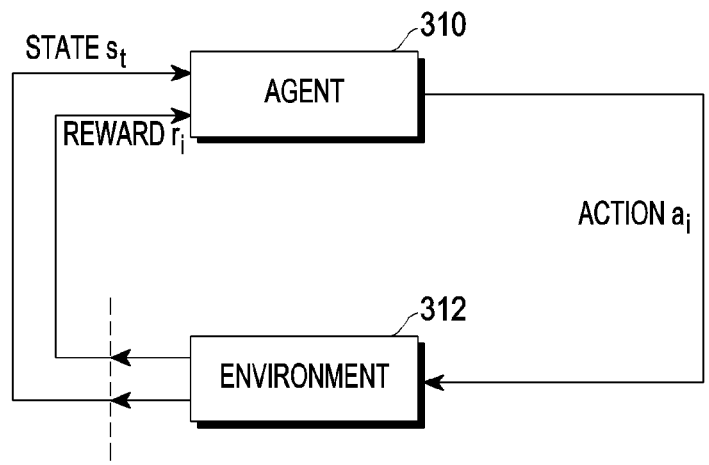
FIG. 3B illustrates a general illustration of an artificial intelligence (AI) network in accordance with some embodiments of the present disclosure.

FIG. 3B illustrates an artificial intelligence (AI) network in accordance with some embodiments of the present disclosure. As shown in FIG. 3B, the AI may be applied for learning dynamically to check whether the network node 101 has decoded the packets received from the first wireless UE 105 or not. Further, by using an "agent 310 and environment 312" model, each action "action $a_t$" may be rewarded with "reward $r_t$" and "state $s_t$" and penalized to make the AI intelligent. Furthermore, by applying AI, the parameters such as, number of required handovers, may be learnt. Also, the quasi-queue-based learning algorithms may be used to improve the performance of the pre-trained neural network.

Figure 3C:
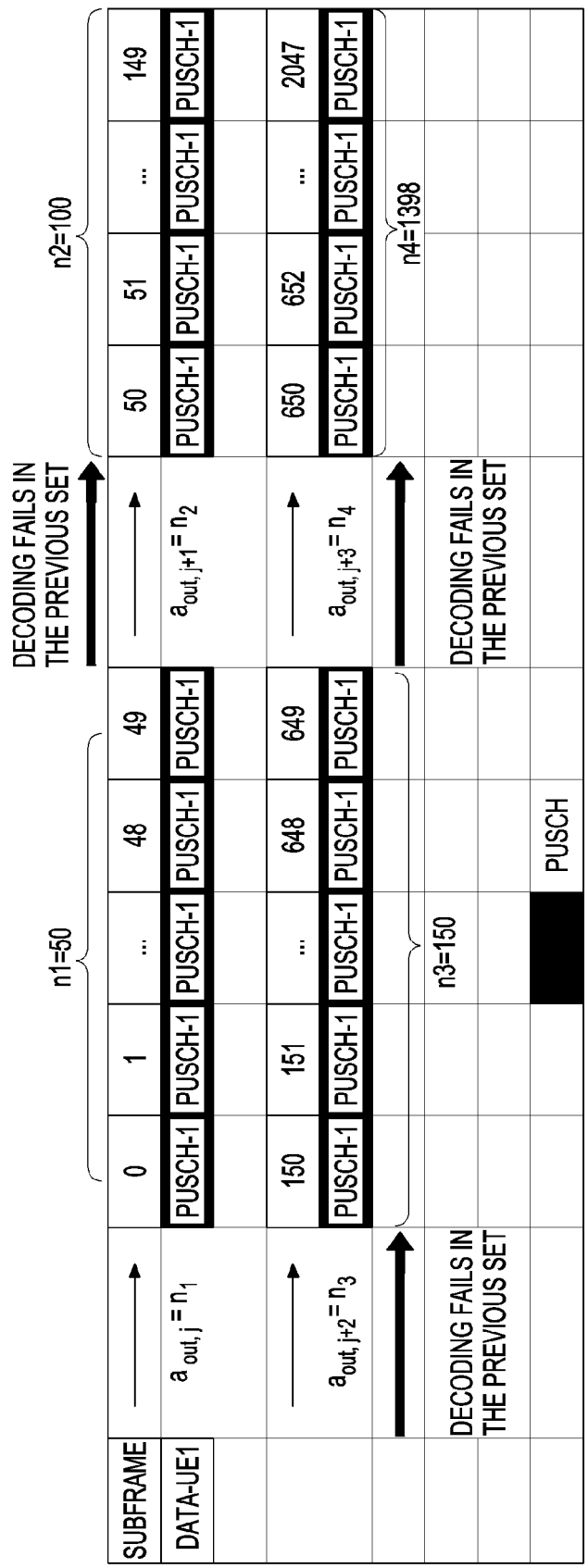
FIG. 3C illustrates a method of optimal resource management in a network in accordance with some embodiments of the present disclosure.

FIG. 3C illustrates a method of optimal resource management in a network in accordance with some embodiments of the present disclosure. In an embodiment, initially, the pre-trained neural network may predict $a_{out,j}$=n1=50, which means that the network node 101 may try to decode after 50 subframes or repetitions. Further, if the decoding for the previous set fails, the deep learning model may generate $a_{out,j}=n2=100$ and repeat the same steps. Furthermore, the said steps may continue until the network node 101 successfully decodes the data. In an embodiment, the pre-trained neural network may intelligently predict "n," where:

$$\sum_{i=1}^{k} ni = maxPUSCHrepetitions$$

In an embodiment, the pre-trained neural network not only learn from the pre-set parameters, but also follow long short-term memory (LSTM) approach, where the pre-trained neural network learns from the historic weight matrices to improve the $a_{out, j\ predictions}$.

In an embodiment, the inputs to the pre-trained neural network may be the one or more network status parameters including time, base station ID, frequency of operation, day details, place or location of the network node and the UEs, density and distribution of traffic, climate conditions around the BS and the UEs, information related to special occasions, festivals and functions, calendar based events, vacation details/distribution, UE information, UE type, UE category or UE monthly subscription package, data type information, measurements, information related to major events like trending offers in shopping malls, movie release dates and sports, school or official events.

Figure 4:
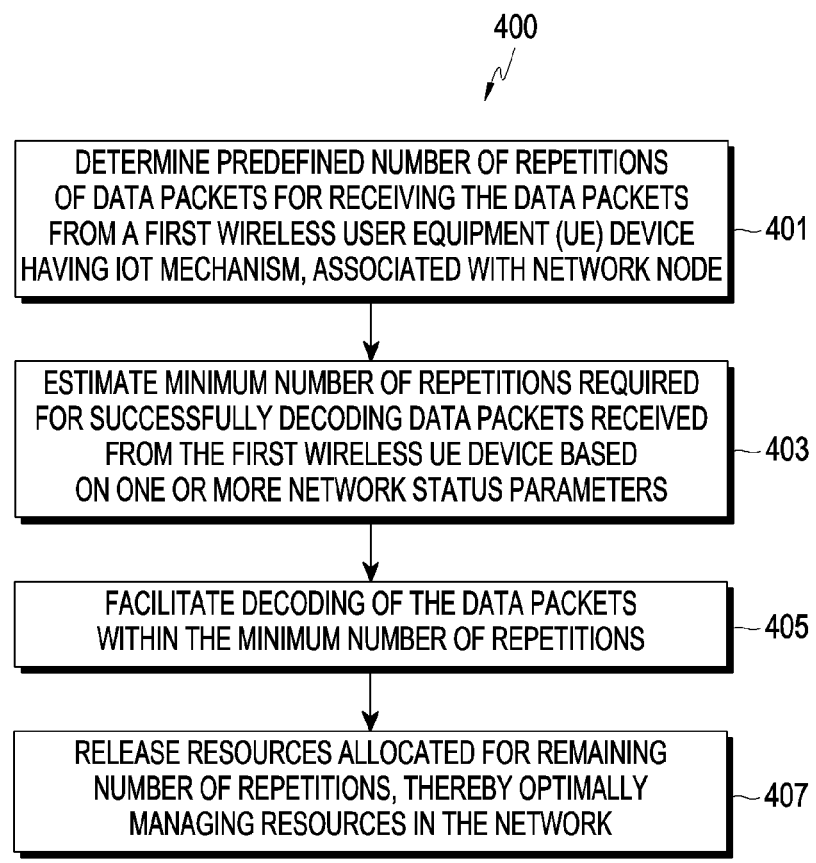
FIG. 4 illustrates a flowchart for a method of optimal resource management in a network in accordance with some embodiments of the present disclosure.

FIG. 4 illustrates a flowchart for a method of optimal resource management in a network in accordance with some embodiments of the present disclosure.

As illustrated in FIG. 4, the method 400 may include one or more blocks illustrating a method of optical resource management in a network using a resource management system 103 illustrated in FIG. 1. The method 400 may be described in the general context of computer executable instructions. Generally, computer executable instructions can include routines, programs, objects, components, data structures, procedures, modules, and functions, which perform specific functions or implement specific abstract data types.

The order in which the method 400 is described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At step 401, the method 400 includes determining, by the determining module 219, the predefined number of repetitions of data packets for receiving the data packets from the first wireless UE 105 associated with the network node 101 in the network.

At step 403, the method 400 includes estimating, by the estimation module 221, the minimum number of repetitions, out of the predefined number of repetitions, required for successfully decoding the data packets received from the first wireless UE 105 based on one or more network status parameters. As an example, the one or more network status parameters may include, without limiting to, at least one of time of transmission of the data packets, BS identification (BSID), frequency of transmission, details of day of the transmission, location of the network node, density and distribution of network traffic, climate conditions, information of the first wireless UE 105, type of data packets, network measurements and other information related to daily events and occasions.

At step 405, the method 400 includes facilitating, by the decoding module 223, decoding of the data packets within the minimum number of repetitions. In an embodiment, the minimum number of repetitions may be estimated using the pre-trained neural network configured in the resource management system 103. In an embodiment, the pre-trained neural network may predict the minimum number of repetitions by analysing the one or more one or more network status parameters.

At step 407, the method 400 includes releasing, by the optimization module 225, the one or more resources allocated for remaining number of repetitions, thereby optimally managing resources in the network. In an embodiment, the one or more resources released from the remaining number of repetitions may be allocated to at least the one of a long-term evolution (LTE) or 5G UEs 109 or the one or more secondary wireless UE 107 having NBIoT mechanism, which are different from the first wireless UE 105. This ensures optimal resource allocation in the network.

Computer System

Figure 5:
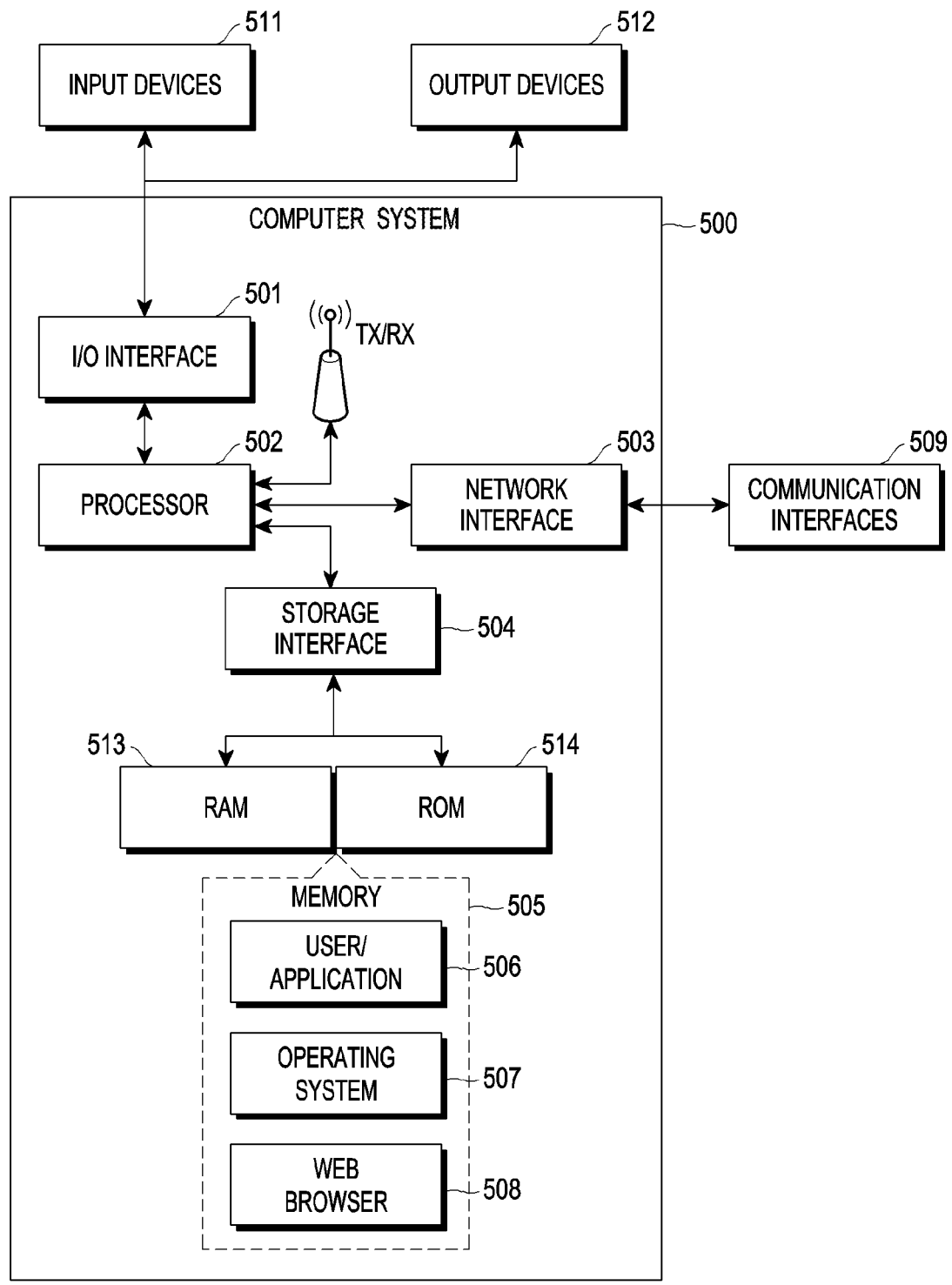
FIG. 5 illustrates an exemplary computing system in accordance with some embodiments of the present disclosure.

FIG. 5 illustrates a block diagram of an exemplary computer system 500 for implementing embodiments consistent with the present disclosure. In an embodiment, the computer system 500 may be the resource management system 103 illustrated in FIG. 1, which may be used for achieving an optimal resource management in a network. The computer system 500 may include a central processing unit ("CPU" or "processor") 502. The processor 502 may comprise at least one data processor for executing program components for executing user- or system-generated business processes. The processor 502 may include specialized processing units such as integrated system (bus) controllers, memory management control units, floating point units, graphics processing units, digital signal processing units, etc.

The processor 502 may be disposed in communication with one or more input/output (I/O) devices (511 and 512) via I/O interface 501. The I/O interface 501 may employ communication protocols/methods such as, without limitation, audio, analog, digital, stereo, IEEE®-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE® 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE) or the like), etc. Using the I/O interface 501, the computer system 500 may communicate with one or more I/O devices 511 and 512.

In some embodiments, the processor 502 may be disposed in communication with a communication network 509 via a network interface 503. The network interface 503 may communicate with the communication network 509. The network interface 503 may employ connection protocols including, without limitation, direct connect, Ethernet (e.g., twisted pair 10/100/1000 Base T), Transmission Control Protocol/Internet Protocol (TCP/IP), token ring, IEEE® 802.11a/b/g/n/x, etc. Using the network interface 503 and the communication network 509, the computer system 500 may communicate with one or more User Equipment (UEs) 515 present on the network. In an implementation, the UEs 515 may include, without limiting to, the first wireless UE 105, the one or more secondary wireless UE 107 and the LTE UEs 109.

In an implementation, the communication network 509 may be implemented as one of the several types of networks, such as intranet or Local Area Network (LAN) and such within the organization. The communication network 509 may either be a dedicated network or a shared network, which represents an association of several types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the communication network 509 may include a variety of network devices, including routers, bridges, servers, computing devices, storage devices, etc.

In some embodiments, the processor 502 may be disposed in communication with a memory 505 (e.g., RAM 513, ROM 514, etc. as shown in FIG. 5) via a storage interface 504. The storage interface 504 may connect to memory 505 including, without limitation, memory drives, removable disc drives, etc., employing connection protocols such as Serial Advanced Technology Attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 505 may store a collection of program or database components, including, without limitation, user/application interface 506, an operating system 507, a web browser 508, and the like. In some embodiments, computer system 500 may store user/application data, such as the data, variables, records, etc. as described in this disclosure. Such databases may be implemented as fault-tolerant, relational, scalable, secure databases such as Oracle® or Sybase®.

The operating system 507 may facilitate resource management and operation of the computer system 500. Examples of operating systems include, without limitation, APPLE® MACINTOSH® OS X®, UNIX®, UNIX-like system distributions (E.G., BERKELEY SOFTWARE DISTRIBUTION® (BSD), FREEBSD®, NETBSD®, OPENBSD, etc.), LINUX® DISTRIBUTIONS (E.G., RED HAT®, UBUNTU®, KUBUNTU®, etc.), IBM® OS/2®, MICROSOFT® WINDOWS® (XP®, VISTA®/7/8, 10 etc.), APPLE® IOS®, GOOGLE™ ANDROID™, BLACKBERRY® OS, or the like.

The user interface 506 may facilitate display, execution, interaction, manipulation, or operation of program components through textual or graphical facilities. For example, the user interface 506 may provide computer interaction interface elements on a display system operatively connected to the computer system 500, such as cursors, icons, check boxes, menus, scrollers, windows, widgets, and the like. Further, Graphical User Interfaces (GUIs) may be employed, including, without limitation, APPLE® MACINTOSH® operating systems' Aqua®, IBM® OS/2®, MICROSOFT® WINDOWS® (e.g., Aero, Metro, etc.), web interface libraries (e.g., ActiveX®, JAVA®, JAVASCRIPT®, AJAX, HTML, ADOBE® FLASH®, etc.), or the like.

The web browser 508 may be a hypertext viewing application. Secure web browsing may be provided using Secure Hypertext Transport Protocol (HTTPS), Secure Sockets Layer (SSL), Transport Layer Security (TLS), and the like. The web browser 508 may utilize facilities such as AJAX, DHTML, ADOBE® FLASH®, JAVASCRIPT®, JAVA®, Application Programming Interfaces (APIs), and the like. Further, the computer system 500 may implement a mail server stored program component. The mail server may utilize facilities such as ASP, ACTIVEX®, ANSI® C++/C#, MICROSOFT®, .NET, CGI SCRIPTS, JAVA®, JAVASCRIPT®, PERL®, PHP, PYTHON®, WEBOBJECTS®, etc. The mail server may utilize communication protocols such as Internet Message Access Protocol (IMAP), Messaging Application Programming Interface (MAPI), MICROSOFT® exchange, Post Office Protocol (POP), Simple Mail Transfer Protocol (SMTP), or the like. In some embodiments, the computer system 500 may implement a mail client stored program component. The mail client may be a mail viewing application, such as APPLE® MAIL, MICROSOFT® ENTOURAGE®, MICROSOFT® OUTLOOK®, MOZILLA® THUNDERBIRD®, and the like.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, nonvolatile memory, hard drives, Compact Disc (CD) ROMs, Digital Video Disc (DVDs), flash drives, disks, and any other known physical storage media.

Advantages of the embodiments of the present disclosure are illustrated herein.

In an embodiment, the method of present disclosure helps in achieving optimal resource utilization in a network.

In an embodiment, the method of present disclosure estimates a minimum number of resources required for completing the data transmission and releases the remaining resources, thereby optimally managing the resource allocation/deallocation process.

In an embodiment, the method of present disclosure provides better spectrum management at the base station (BS) and provides low latency.

In an embodiment, the method of present disclosure optimizes power consumption at the user equipment (UE) by limiting/reducing the number of times the UE is required to re-transmit and/or repeat the transmission.

Evidently, the present disclosure has a practical application and provides a technically advanced solution to the technical problems associated with existing techniques for resource allocation in a cellular network. The aforesaid technical advancements and practical applications of the disclosed method may be attributed to the aspect of intelligently estimating the minimum number of repetitions required for successfully decoding the data packets received from the first wireless UE with NBIoT mechanism.

In light of the technical advancements provided by the disclosed method and system, the claimed steps, as discussed above, are not routine, conventional, or well-known aspects in the art, as the claimed steps provide the aforesaid solutions to the technical problems existing in the conventional technologies. Further, the claimed steps clearly bring an improvement in the functioning of the UEs itself, as the claimed steps provide a technical solution to a technical problem.

The terms "an embodiment", "embodiment", "embodiments", "the embodiment", "the embodiments", "one or more embodiments", "some embodiments", and "one embodiment" mean "one or more (but not all) embodiments of the disclosure(s)" unless expressly specified otherwise.

The terms "including", "comprising", "having" and variations thereof mean "including but not limited to", unless expressly specified otherwise. The enumerated listing of items does not imply that any or all the items are mutually exclusive, unless expressly specified otherwise. The terms "a", "an" and "the" mean "one or more", unless expressly specified otherwise.

A description of an embodiment with several components in communication with each other does not imply that all such components are required. On the contrary, a variety of optional components are described to illustrate the wide variety of possible embodiments of the disclosure.

When a single device or article is described herein, it will be clear that more than one device/article (whether more than one device/article cooperate) may be used in place of a single device/article. Similarly, where more than one device or article is described herein (whether more than one device or article cooperate), it will be clear that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the disclosure need not include the device itself.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based here on. Accordingly, the embodiments of the present disclosure are intended to be illustrative, but not limiting, of the scope of the disclosure, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the scope being indicated by the following claims.

Although the present disclosure has been described with various embodiments, various changes and modifications may be suggested to one skilled in the art. It is intended that the present disclosure encompass such changes and modifications as fall within the scope of the appended claims.

What is claimed is:

1. A method for managing, by a network node, resources in a network, the method comprising:
   determining a predefined number of repetitions of data packets for receiving the data packets from a user equipment (UE) associated with the network node;
   prior to decoding the data packets, estimating, using a neural network receiving inputs that comprises a base station identification (BSID), a frequency of operation, and a category of the UE and predicts a number of repetitions for successfully decoding the data packets received from the UE, the number of repetitions for successfully decoding the data packets received from the UE, wherein the estimated number of repetitions is less than the predefined number of repetitions;
   decoding the data packets within the estimated number of repetitions; and
   releasing one or more resources allocated for a remaining number of repetitions in the network.

2. The method of claim 1, further comprising allocating the one or more resources released from the remaining number of repetitions to at least one of a long-term evolution (LTE) and 5G UE or one or more secondary wireless UEs using a narrowband IoT mechanism that is different from the UE.

3. The method of claim 1, wherein the UE is a low power device.

4. The method of claim 1, further comprising decoding the data packets after each transmission time interval (TTI) corresponding to a predefined subframe.

5. The method of claim 1, wherein the inputs of the neural network further comprises at least one of a movie release date, a sport event, or a school event.

6. A network node for managing resources in a network, the network node comprising:
   a memory; and
   a processor communicatively coupled to the memory, the processor configured to:
      determine a predefined number of repetitions of data packets for receiving the data packets from a user equipment (UE) associated with a network node;
      prior to decoding the data packets, estimate, using a neural network receiving inputs that comprises a base station identification (BSID), a frequency of operation, and a category of the UE and predicts a number of repetitions for successfully decoding the data packets received from the UE, the number of repetitions required for successfully decoding the data packets received from the UE, wherein the estimated number of repetitions is less than the predefined number of repetitions;
      decode the data packets within the estimated number of repetitions; and
      release one or more resources allocated for a remaining number of repetitions.

7. The network node of claim 6, wherein the processor is further configured to allocate the one or more resources released from the remaining number of repetitions to at least one of a long-term evolution (LTE) and 5G UE or one or more secondary wireless UEs using a narrowband IoT mechanism that is different from the UE.

8. The network node of claim 6, wherein the processor is further configured to decode the data packets after each transmission time interval (TTI) corresponding to a predefined subframe.

9. The network node of claim 6, wherein the UE is a low power device.

10. A non-transitory computer-readable medium comprising program code, that when executed by a processor of a network node, causes the network node to:
   determine a predefined number of repetitions of data packets for receiving the data packets from a user equipment (UE) associated with a network node;
   prior to decoding the data packets, estimate, using a neural network receiving inputs that comprises a base station identification (BSID), a frequency of operation, and a category of the UE and predicts a number of repetitions for successfully decoding the data packets received from the UE, the number of repetitions required for successfully decoding the data packets received from the UE, wherein the estimated number of repetitions is less than the predefined number of repetitions;

decode the data packets within the estimated number of repetitions; and release one or more resources allocated for a remaining number of repetitions.

11. The non-transitory computer-readable medium as claimed in claim 10, further comprising program code, that when executed by the processor, causes the network node to allocate the one or more resources released from the remaining number of repetitions to at least one of a long-term evolution (LTE) and 5G UE or one or more secondary wireless UEs using a narrowband IoT mechanism that is different from the wireless UE.

12. The non-transitory computer-readable medium of claim 10, further comprising program code, that when executed by the processor, causes the network node to decode the data packets after each transmission time interval (TTI) corresponding to a predefined subframe.

13. The non-transitory computer-readable medium of claim 10, wherein the UE is a low power device.

* * * * *